(12) United States Patent
Chen et al.

(10) Patent No.: US 8,245,591 B2
(45) Date of Patent: Aug. 21, 2012

(54) ENGINE SCISSOR GEAR ASSEMBLY

(75) Inventors: Joseph Young-Long Chen, Ann Arbor, MI (US); Arvo J. Siismets, Troy, MI (US); Scott R. Zechiel, Ypsilanti, MI (US); Michael S. Powell, Holt, MI (US)

(73) Assignee: GM Global Technology Operations LLC

( * ) Notice: Subject to any disclaimer, the term of this patent is extended or adjusted under 35 U.S.C. 154(b) by 443 days.

(21) Appl. No.: 12/536,064

(22) Filed: Aug. 5, 2009

(65) Prior Publication Data

US 2011/0030489 A1    Feb. 10, 2011

(51) Int. Cl.
*F16H 55/18* (2006.01)
(52) U.S. Cl. .......................................... 74/409; 74/440
(58) Field of Classification Search ................... 74/409, 74/440
See application file for complete search history.

(56) References Cited

U.S. PATENT DOCUMENTS

| | | | |
|---|---|---|---|
| 1,629,564 A | 5/1927 | White | |
| 4,577,525 A | 3/1986 | Ikemoto et al. | |
| 5,560,267 A | 10/1996 | Todd et al. | |
| 5,771,745 A | 6/1998 | Goette et al. | |
| 5,979,259 A * | 11/1999 | Shook et al. | 74/409 |
| 5,979,260 A * | 11/1999 | Long et al. | 74/440 |
| 6,615,683 B1 * | 9/2003 | Voigt | 74/440 |
| 6,752,119 B2 * | 6/2004 | Coleman | 123/195 C |
| 7,007,565 B2 | 3/2006 | Allen et al. | |

FOREIGN PATENT DOCUMENTS

DE    19616503 A1    11/1996

* cited by examiner

*Primary Examiner* — Justin Krause
(74) *Attorney, Agent, or Firm* — Harness, Dickey & Pierce, P.L.C.

(57) ABSTRACT

A scissor gear assembly may include first and second gears, a friction plate, and a biasing member. The first gear may have a first number (n) of gear teeth extending from a perimeter thereof. The second gear may have a second number (m) of gear teeth extending from a perimeter thereof and may be concentrically mounted relative to the first gear and rotatable relative to the first gear. The second number (m) of gear teeth may be greater than the first number (n) of gear teeth. The friction plate may be rotationally fixed relative to the first gear. The biasing member may have a first end axially fixed relative to the first gear and a second end axially biasing the second gear and the friction plate into engagement with one another.

20 Claims, 4 Drawing Sheets

ENGINE SCISSOR GEAR ASSEMBLY

FIELD

The present disclosure relates to internal combustion engines, and more specifically to engine scissor gear assemblies.

BACKGROUND

This section provides background information related to the present disclosure which is not necessarily prior art.

Engine assemblies may include gear drive assemblies to transfer rotation between rotary engine components. The gear drive assemblies may include a first and second gears engaged with one another. Clearances between the first and second gears may create a backlash condition between the gears during engine operation. The gear backlash may result in gear rattle during engine operation.

SUMMARY

A scissor gear assembly may include first and second gears, a friction plate, and a biasing member. The first gear may have a first number (n) of gear teeth extending from a perimeter thereof. The second gear may have a second number (m) of gear teeth extending from a perimeter thereof and may be concentrically mounted relative to the first gear and rotatable relative to the first gear. The second number (m) of gear teeth may be greater than the first number (n) of gear teeth. The friction plate may be rotationally fixed relative to the first gear. The biasing member may have a first end axially fixed relative to the first gear and a second end axially biasing the second gear and the friction plate into engagement with one another.

An engine assembly may include first and second rotating engine components, a first gear coupled to the first rotating engine component, and a scissor gear assembly coupled to the second rotating engine component and engaged with the first gear to transfer rotation between the first gear and the scissor gear assembly. The scissor gear assembly may include a rotationally fixed gear, a rotatable gear, a friction plate, and a biasing member. The rotationally fixed gear may be fixed for rotation with the second rotating engine component and may have a first number (n) of gear teeth extending from a perimeter thereof. The rotatable gear may be coupled to the second rotating engine component and may be rotatable relative to the rotationally fixed gear. The rotatable gear may have a second number (m) of gear teeth extending from a perimeter thereof, wherein (m) is greater than (n). The friction plate may be rotationally fixed relative to the second rotating engine component. The biasing member may have a first end axially fixed relative to the rotationally fixed gear and a second end axially biasing the rotatable gear and the friction plate into engagement with one another.

A method of reducing engine gear rattle may include driving rotation of a first rotary engine component having a first gear rotationally fixed thereto and driving rotation of a second rotary engine component having a scissor gear assembly coupled thereto. The scissor gear assembly may include a rotationally fixed gear fixed for rotation with the second rotary engine component and having a first number (n) of gear teeth extending from a perimeter thereof and a rotatable gear coupled to the second rotary engine component and being rotatable relative to the rotationally fixed gear. The rotatable gear may have a second number (m) of gear teeth extending from a perimeter thereof, wherein (m) is greater than (n). The scissor gear assembly may additionally include a friction plate rotationally fixed relative to the second rotating engine component and a biasing member having a first end axially fixed relative to the rotationally fixed gear and a second end applying an axial force to the rotatable gear and the friction plate. The method may further include transferring rotation between the first and second rotary engine components via a drive member engaged with the scissor gear assembly and maintaining engagement between the drive member and the scissor gear assembly. The maintaining engagement may include axially biasing the rotatable gear and the friction plate into engagement with one another and the drive member rotating the rotatable gear relative to the rotationally fixed gear during the driving rotation of the second rotary engine component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Figure 1:
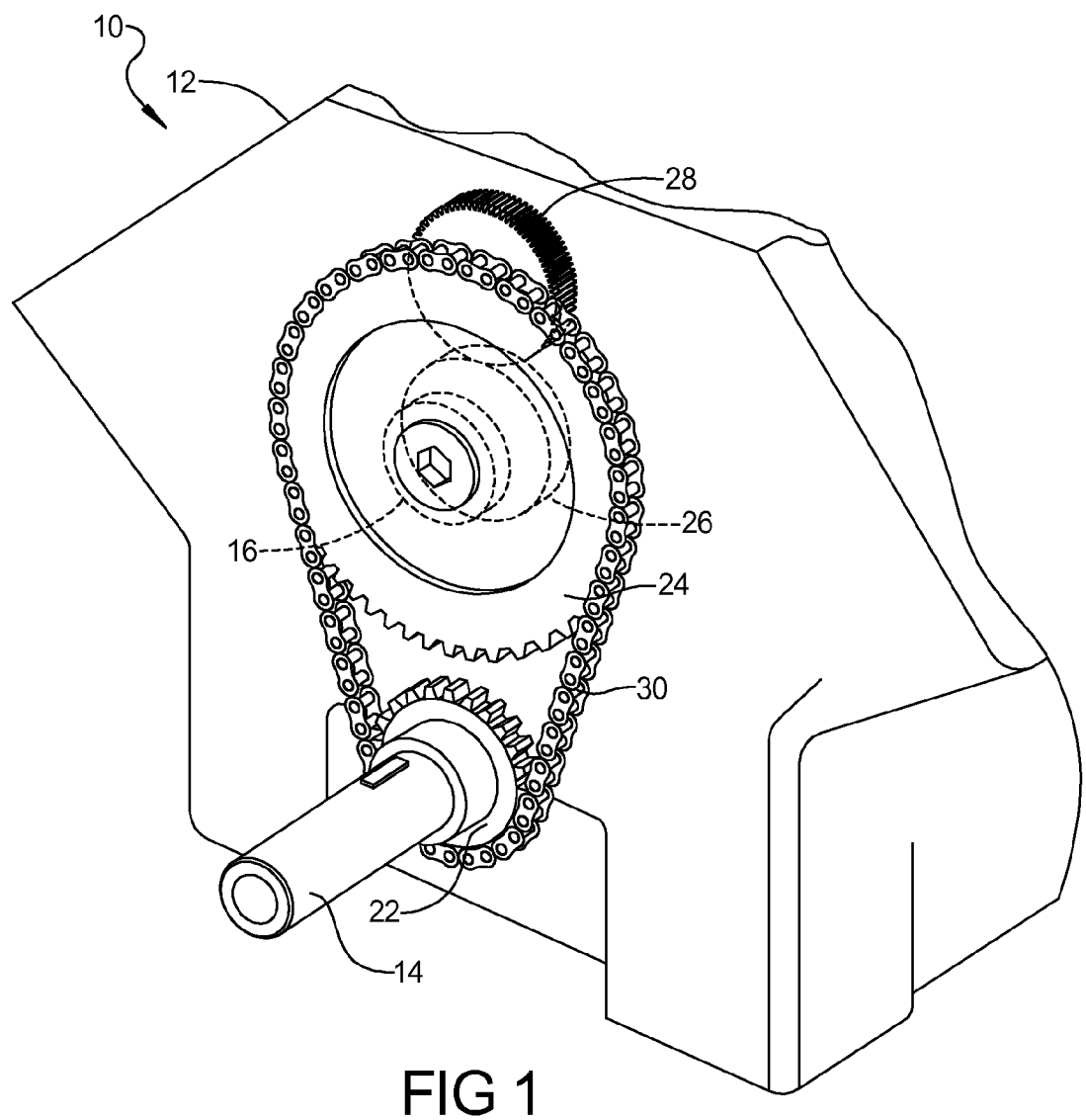
FIG. 1 is a fragmentary perspective illustration of an engine assembly according to the present disclosure.
Figure 2:
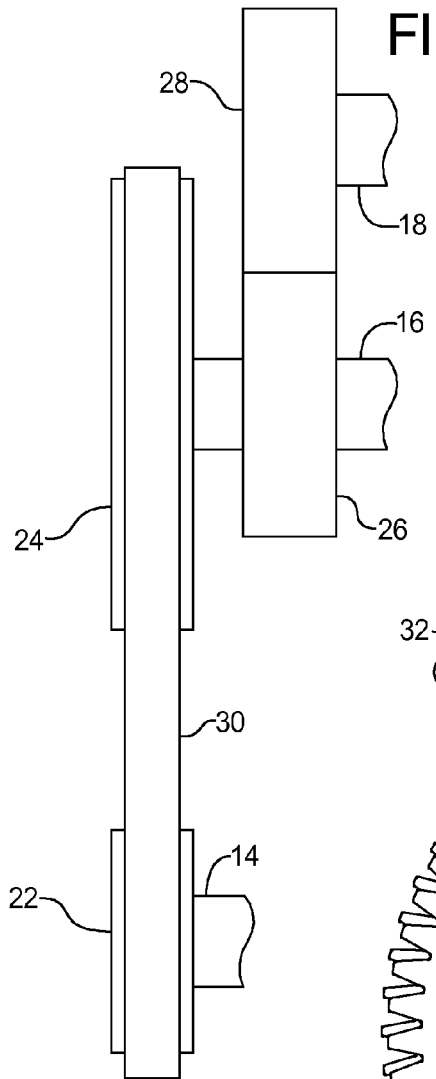
FIG. 2 is a fragmentary schematic illustration of the engine assembly of FIG. 1.

Referring now to FIGS. 1 and 2, an engine assembly 10 is schematically illustrated. The engine assembly 10 may include an engine structure 12 rotationally supporting first, second and third rotary engine components 14, 16, 18. By way of non-limiting example, the engine structure 12 may include an engine block or a cylinder head. The first rotary engine component 14 may include a crankshaft, the second engine component 16 may include a camshaft and the third rotary engine component 18 may include a balance shaft or a fuel pump drive shaft. While illustrated in combination with a cam-in-block engine configuration, it is understood that the present disclosure applies equally to overhead cam configurations.

A first gear assembly 22 may be coupled to the first rotary engine component 14, second and third gear assemblies 24, 26 may be coupled to the second rotary engine component 16 and a fourth gear assembly 28 may be coupled to the third rotary engine component 18. The first gear assembly 22 may be rotationally driven by the first rotary engine component 14. A drive chain 30 may be engaged with the first and second gear assemblies 22, 24 to transfer rotation from the first gear assembly to the second gear assembly 24 and drive the second rotary engine component 16.

The third gear assembly 26 may be rotated with the second rotary engine component 16 and the second gear assembly 24 and may be engaged with the fourth gear assembly 28 to drive rotation of the third rotary engine component 18. With additional reference to FIGS. 3 and 6, a scissor gear assembly 32 is illustrated. The scissor gear assembly 32 may be included in any of the first, second, third and fourth gear assemblies 22, 24, 26, 28.

Figure 3:
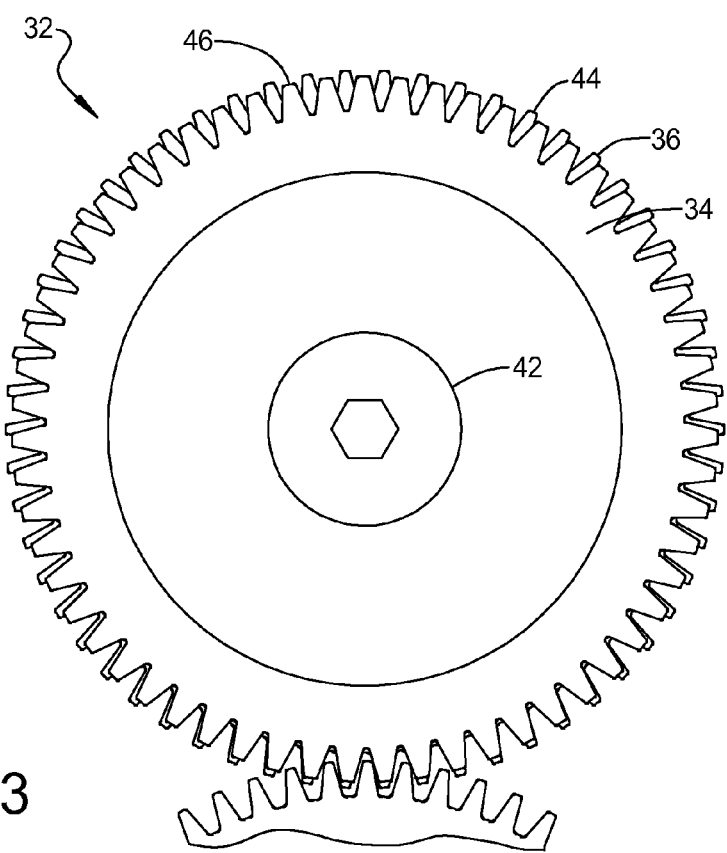
FIG. 3 is a plan view of a scissor gear assembly according to the present disclosure.

The scissor gear assembly 32 may include a rotationally fixed gear 34, a rotatable gear 36, a friction plate 38, a biasing member 40 and a stop member 42. As seen in FIG. 3, the rotationally fixed gear 34 may have a first number (n) of gear teeth 44 extending from a perimeter thereof. The rotatable gear 36 may have a second number (m) of gear teeth 46 extending from a perimeter thereof. In the present non-limiting example, the rotationally fixed gear 34 includes fifty-eight gear teeth 44 (n=58) and the rotatable gear 36 includes fifty-nine gear teeth 46 (m=59). Therefore, the second number (m) of gear teeth 46 may be greater than first number (n) of gear teeth 44, and in the present non-limiting example, m=n+1.

Figure 6:
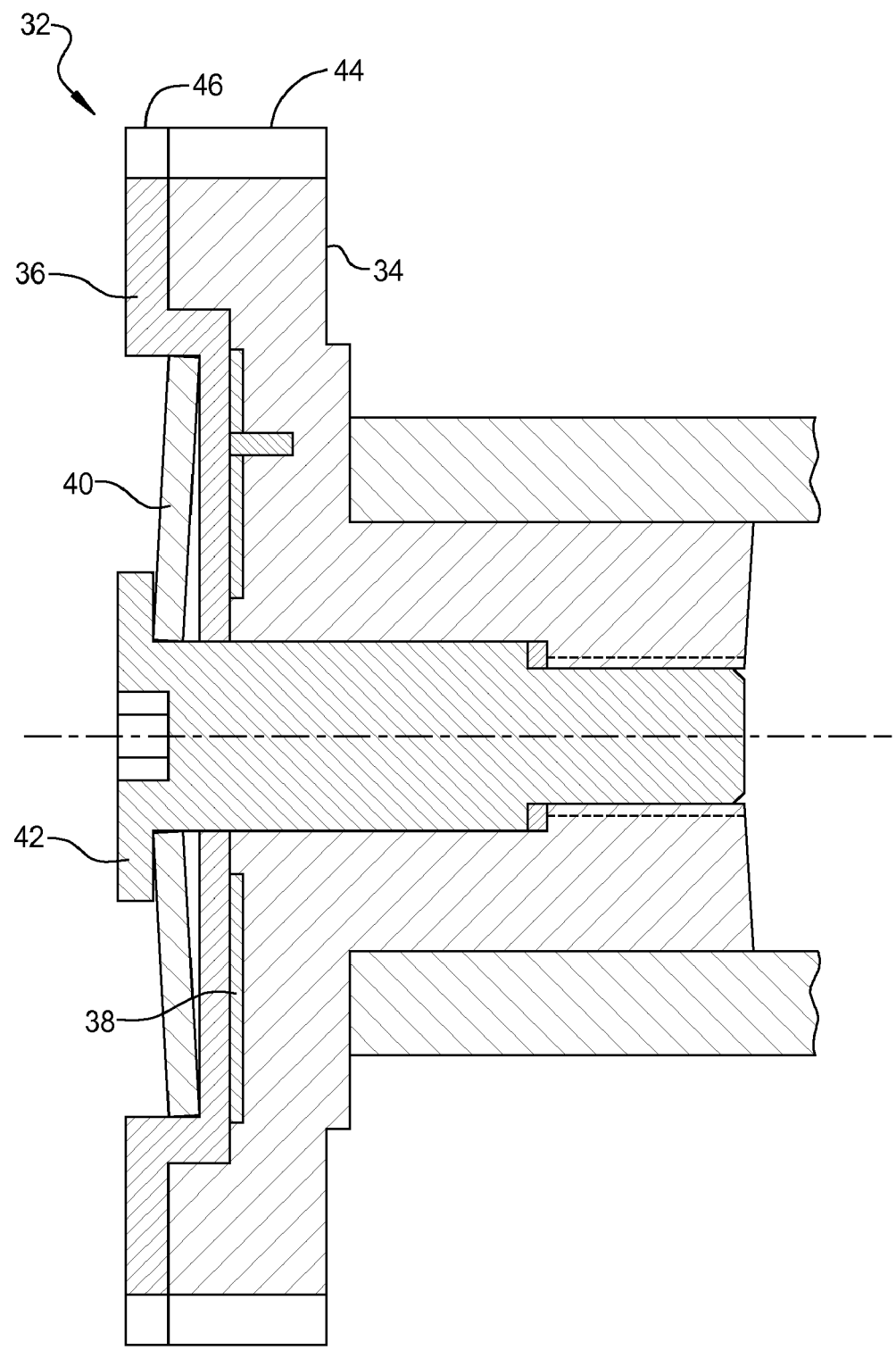
FIG. 6 is a schematic section view of the scissor gear assembly of FIG. 3.

With reference to FIG. 6, the rotationally fixed gear 34 may be fixed for rotation with any one of the rotary engine components 14, 16, 18. The friction plate 38 may be located axially between the rotationally fixed gear 34 and the rotatable gear 36 and may be rotationally fixed relative to the rotationally fixed gear 34, and therefore relative to the one of the rotary engine components 14, 16, 18 that the rotationally fixed gear 34 is coupled to. The stop member 42 may be axially fixed relative to the rotationally fixed gear 34 and the biasing member 40 may be located axially between the stop member 42 and the rotatable gear 36. A first end of the biasing member 40 may abut the stop member 42 and a second end of the biasing member 40 may abut the rotatable gear 36 and apply an axial force biasing the rotatable gear 36 and the friction plate 38 into engagement with one another. A variety of biasing members may be used including, but not limited to, wave springs and Belleville springs.

Figure 4:
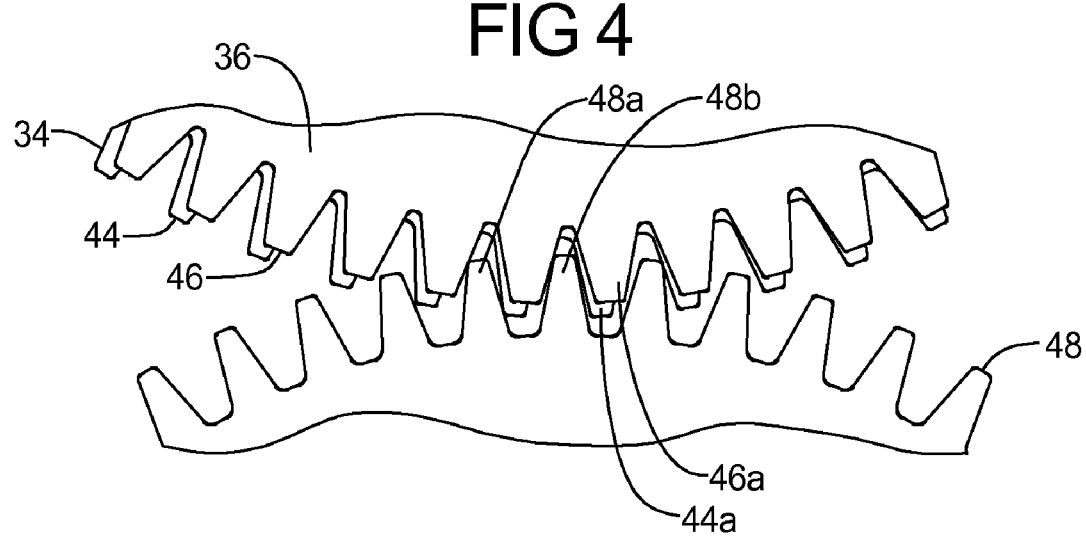
FIG. 4 is a fragmentary plan view of the scissor gear assembly of FIG. 3 engaged with another gear.

In a first non-limiting example, seen in FIG. 4, the fourth gear assembly 28 may include the scissor gear assembly 32. The scissor gear assembly 32 may be rotationally driven by the third gear assembly 26. The third gear assembly 26 may include a single gear fixed for rotation with the second rotary engine component 16. The third gear assembly 26 may include gear teeth 48 extending from an outer perimeter thereof and engaged with gear teeth 44, 46 of the scissor gear assembly 32. The third gear assembly 26 may drive rotation of the rotatable gear 36 relative to the rotationally fixed gear 34 during engine operation. More specifically, the rotatable gear 36 may be rotated both clockwise and counterclockwise. The rotatable gear 36 may be rotationally driven relative to the rotationally fixed gear 34 and may be rotated at a speed greater than the rotational speed of the rotationally fixed gear 34. The engagement between the gear teeth 44, 46, 48 may limit a backlash condition. More specifically, a first gear tooth 44a of the rotationally fixed gear 34 and a first gear tooth 46a of the rotatable gear 36 may be located between adjacent gear teeth 48a, 48b of the third gear assembly 26. The first gear tooth 44a may abut the first gear tooth 48a and the first gear tooth 46a may abut the second gear tooth 48b, eliminating a backlash condition.

In the non-limiting example of FIG. 4, the scissor gear assembly 32 is driven by rotation of the third gear assembly 26. However, it is understood that the present disclosure applies equally to configurations where the scissor gear assembly 32 is the driving gear. By way of non-limiting example, the third gear assembly 26 may include the scissor gear assembly 32 and may rotationally drive the fourth gear assembly 28.

Figure 5:
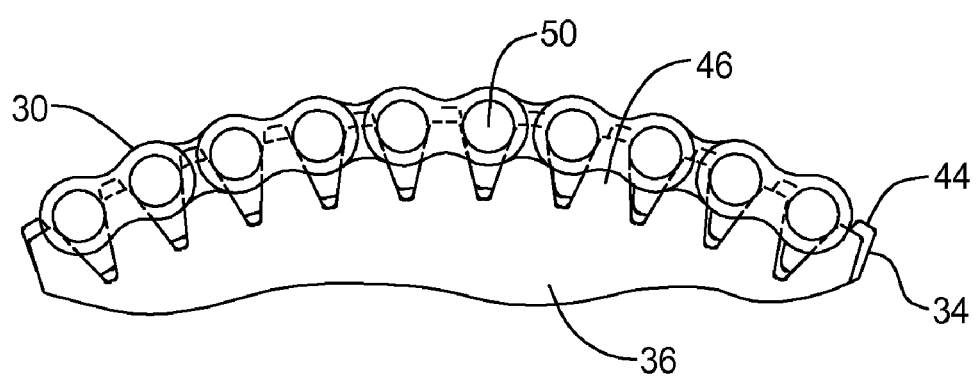
FIG. 5 is a fragmentary plan view of the scissor gear assembly of FIG. 3 engaged with a drive chain.

In a second non-limiting example, seen in FIG. 5, the second gear assembly 24 may include the scissor gear assembly 32. The scissor gear assembly 32 may be rotationally driven by the drive chain 30. The drive chain 30 may include link members 50 located between adjacent ones of the gear teeth 44, 46. The engagement between the link members 50 and the gear teeth 44, 46 may limit rattle between the drive chain 30 and the scissor gear assembly 32. The drive chain 30 may drive rotation of the rotatable gear 36 relative to the rotationally fixed gear 34 during engine operation. More specifically, the rotatable gear 36 may be rotated both clockwise and counterclockwise.

In the non-limiting example of FIG. 5, the scissor gear assembly 32 is driven by rotation of the drive chain 30. However, it is understood that the present disclosure applies equally to configurations where the scissor gear assembly 32 drives the drive chain 30. By way of non-limiting example, the first gear assembly 22 may include the scissor gear assembly 32 and may rotationally drive the drive chain 30.

What is claimed is:

1. A scissor gear assembly comprising:
    a first gear having a first number (n) of gear teeth extending from a perimeter thereof;
    a second gear having a second number (m) of gear teeth extending from a perimeter thereof, being concentrically mounted relative to the first gear and being rotatable relative to the first gear, wherein (m) is greater than (n) and the gear teeth from both the first and second gears are engaged with an additional engine gear or an engine drive chain;
    a friction plate rotationally fixed relative to the first gear; and
    a biasing member having a first end axially fixed relative to the first gear and a second end axially biasing the second gear and the friction plate into engagement with one another.

2. The scissor gear assembly of claim 1, wherein (m) is equal to (n)+1.

3. The scissor gear assembly of claim 1, further comprising a stop member axially fixed to the first gear, the first end of the biasing member abutting the stop member.

4. The scissor gear assembly of claim 3, wherein the second gear is located axially between the stop member and the first gear.

5. The scissor gear assembly of claim 4, wherein the friction plate is located axially between the first and second gears.

6. The scissor gear assembly of claim 1, wherein the second gear is located axially between the second end of the biasing member and the friction plate.

7. An engine assembly comprising:
    a first rotating engine component;
    a first gear coupled to the first rotating engine component;
    a second rotating engine component; and
    a scissor gear assembly coupled to the second rotating engine component and engaged with the first gear to transfer rotation between the first gear and the scissor gear assembly, the scissor gear assembly including:
        a rotationally fixed gear fixed for rotation with the second rotating engine component and having a first number (n) of gear teeth extending from a perimeter thereof;
        a rotatable gear coupled to the second rotating engine component and being rotatable relative to the rotationally fixed gear, the rotatable gear having a second number (m) of gear teeth extending from a perimeter thereof, wherein (m) is greater than (n) and the first gear includes gear teeth extending from a perimeter thereof and engaged with the gear teeth of the rotationally fixed and rotatable gears;

a friction plate rotationally fixed relative to the second rotating engine component; and a biasing member having a first end axially fixed relative to the rotationally fixed gear and a second end axially biasing the rotatable gear and the friction plate into engagement with one another.

8. The engine assembly of claim 7, wherein the first gear drives rotation of the rotatable gear relative to the rotationally fixed gear.

9. The engine assembly of claim 7, wherein (m) is equal to (n)+1.

10. The engine assembly of claim 7, further comprising a stop member axially fixed relative to the rotationally fixed gear, the first end of the biasing member abutting the stop member.

11. The engine assembly of claim 10, wherein the rotatable gear is located axially between the stop member and the rotationally fixed gear.

12. The engine assembly of claim 11, wherein the friction plate is located axially between the rotationally fixed gear and the rotatable gear.

13. The engine assembly of claim 7, wherein the rotatable gear is located axially between the second end of the biasing member and the friction plate.

14. An engine assembly comprising:
a first rotating engine component;
a first gear coupled to the first rotating engine component;
a second rotating engine component;
a scissor gear assembly coupled to the second rotating engine component and engaged with the first gear to transfer rotation between the first gear and the scissor gear assembly, the scissor gear assembly including:

a rotationally fixed gear fixed for rotation with the second rotating engine component and having a first number (n) of gear teeth extending from a perimeter thereof;

a rotatable gear coupled to the second rotating engine component and being rotatable relative to the rotationally fixed gear, the rotatable gear having a second number (m) of gear teeth extending from a perimeter thereof, wherein (m) is greater than (n);

a friction plate rotationally fixed relative to the second rotating engine component; and a biasing member having a first end axially fixed relative to the rotationally fixed gear and a second end axially biasing the rotatable gear and the friction plate into engagement with one another; and a drive chain engaged with the first gear, the rotationally fixed gear, and the rotatable gear.

15. The engine assembly of claim 14, wherein the drive chain drives rotation of the rotatable gear relative to the rotationally fixed gear.

16. The engine assembly of claim 14, wherein (m) is equal to (n)+1.

17. The engine assembly of claim 14, further comprising a stop member axially fixed relative to the rotationally fixed gear, the first end of the biasing member abutting the stop member.

18. The engine assembly of claim 17, wherein the rotatable gear is located axially between the stop member and the rotationally fixed gear.

19. The engine assembly of claim 18, wherein the friction plate is located axially between the rotationally fixed gear and the rotatable gear.

20. The engine assembly of claim 14, wherein the rotatable gear is located axially between the second end of the biasing member and the friction plate.

* * * * *